June 22, 1954 V. A. UNDERWOOD 2,681,507
SCRIBER AND STEEL RULE ASSEMBLY
Filed Sept. 18, 1952
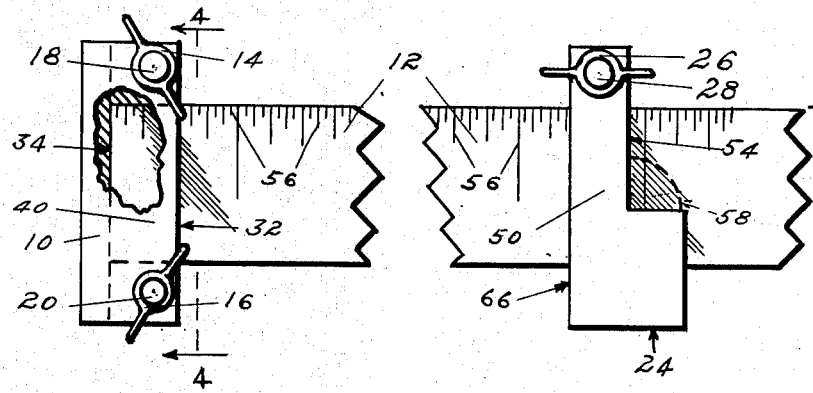
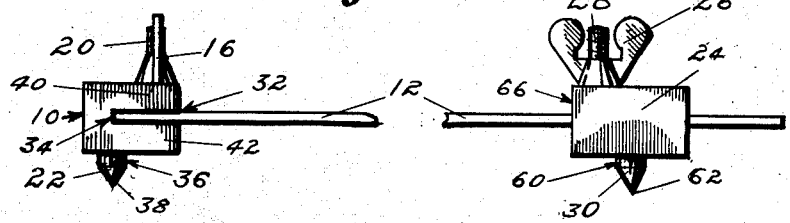
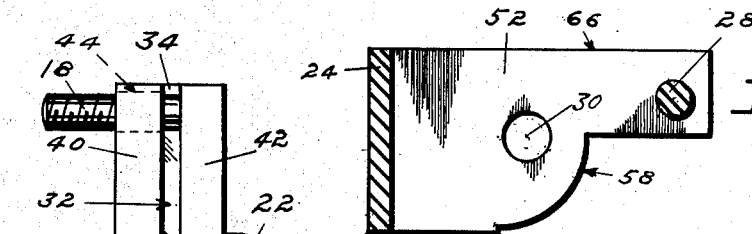
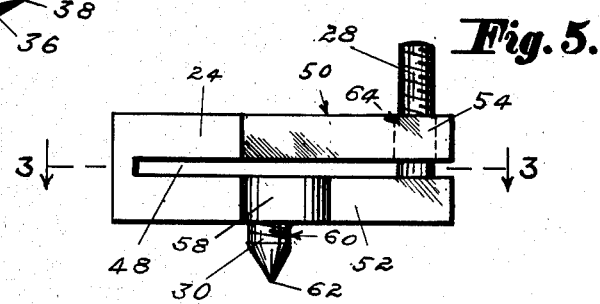
INVENTOR.
VERLIN A. UNDERWOOD
BY Arthur H Sturges
Attorney.

Patented June 22, 1954

2,681,507

UNITED STATES PATENT OFFICE 2,681,507

SCRIBER AND STEEL RULE ASSEMBLY

Verlin A. Underwood, Mesa, Ariz.

Application September 18, 1952, Serial No. 310,230

1 Claim. (Cl. 33—27)

This invention relates to instruments and tools particularly adapted for use in scribing sheet metal work for forming and cutting, and in particular a gage in the form of a T-square having a head clamped on the end of a metal straight edge or scale with a slider clamped on the scale and in which both the head and slider are provided with threaded studs having pointed ends.

The purpose of this invention is to provide a scribing tool for use in sheet metal work with which both arcuate and straight lines may be inscribed accurately on sheet metal.

Various types of scribing or marking tools have been provided for sheet metal and other work, however, where it is necessary to measure the distance between points with a steel or other scale it is difficult to position the points with accuracy. With this thought in mind this invention contemplates a straight edge, such as a steel scale or rule with points clamped to the scale with clamping means wherein one point is positioned exactly at the end of the scale and another point is aligned with one edge of the clamping means therefor whereby with the edge with which the point is aligned adjusted to a dimension on the scale the distance between the points will be equal to the said dimension.

The object of this invention is, therefore, to provide means for clamping points or centers on a steel straight edge or rule whereby the points may be accurately set to dimensions designated on the straight edge or rule.

Another object of the invention is to provide a scribing tool for accurately marking straight lines or curves on sheet material to facilitate laying out sizes and designs on the material.

Furthermore, in working up sheet metal it is often necessary to inscribe lines on the material which are parallel to the edge of the material. With the use of conventional means where lines parallel to the edge of the material are required the dimensions are marked at each end of the material and lines are inscribed from one point to another. By this means it is difficult to position the lines exactly parallel to the edge.

For this use this invention includes a scribing tool wherein with an edge of one element held against an edge of a sheet of material the tool may be drawn over the material with a scribing point held by another element of the tool inscribing a line parallel to the edge of the material.

A further object of this invention is to provide a scribing tool for sheet metal work in which dimensions are provided on the body of the tool.

A still further object of the invention is to provide a scribing tool for laying out sizes and designs on sheet metal in which the tool is formed by clamping points on a straight edge or scale and in which the tool is of a simple and economical construction.

With these and other objects and advantages in view the invention embodies a clamp forming a head and having a slot for receiving the end of a straight edge and a point positioned to correspond with the end of the straight edge, and a slider adjustably mounted on the straight edge and having a point positioned to correspond with one edge thereof whereby with the edge of the slider positioned on a dimension the point of the slider will also be positioned on said dimension.

Other features and advantages of the invention will appear from the following description taken in connection with the drawing, wherein:

Figure 1 is a plan view of the improved sheet metal scribing tool with parts broken away and showing a head and a slider positioned on a straight edge.

Figure 2 is a side elevational view of the tool shown in Figure 1, also with parts broken away.

Figure 3 is a sectional plan through the slider of the tool shown in Figure 1 with other parts omitted, and taken on line 3—3 of Figure 5.

Figure 4 is a front elevational view of the head of the tool taken on line 4—4 of Figure 1 with the straight edge or scale omitted and with the parts shown on an enlarged scale.

Figure 5 is an end elevational view of the slider looking toward the end in which the cut-away portions are provided, also with the scale omitted and also with the parts shown on an enlarged scale.

Referring now to the drawing wherein like reference characters denote corresponding parts the improved sheet metal scribing tool of this invention includes a head 10 clamped on a scale 12 with thumb nuts 14 and 16 on threaded studs 18 and 20, respectively, and having a centering stud 22, and a slider 24 also positioned on the scale and clamped thereon with a thumb nut 26 on a threaded stud 28 and having a centering or scribing stud 30 threaded in the lower part thereof.

The head 10 which is rectangular-shaped in cross section, is provided with a longitudinally disposed horizontally positioned slot 32 that extends inwardly from one side to a wall 34, and as illustrated in Figure 1 the end of the scale 12 is positioned against the wall 34. The stud 22, which is provided with flat sides 36, to facilitate turning the stud with a wrench, and a conical-shaped point 38 is threaded into the lower side of the head and, as shown in Figure 2, the point 38 is positioned in a plane extended on the wall 34, whereby with the end of the scale 12 positioned against the wall the point will be positioned to correspond to the end or beginning of the scale.

The slot 32 divides the head into an upper flange 40 and a lower flange 42 and, as shown in Figure 4, the studs 18 and 20 are fixedly mounted in the lower flange 42 and extend through openings 44 and 46 in the upper flange 40 whereby the thumb or wing nuts 14 and 16 threaded on the studs 18 and 20, respectively, are adapted to clamp the head on the scale with the end of the scale in the slot 32. With the studs 18 and 20 spaced from the edges of the scale 12 the scale is adapted to be adjusted longitudinally in the head to facilitate adjusting the graduated edge 56 in relation to the stud 22.

The slider 24 which is also rectangular-shaped in cross section, is also provided with a longitudinally positioned horizontally disposed slot, as indicated by the numeral 48, and this slot 48 divides the slider into an upper flange 50 and a lower flange 52. The flanges 50 and 52 are substantially L-shaped and the flange 50 is provided with a straight edge 54 that is parallel to the inner edge of the head, providing a gage, and that is positioned to register with graduations 56 on the scale 12 with the scale extended through the slot 48. The flange 52 is provided with an arcuate section 58 and the stud 30 which is also provided with flat sides, as indicated by the numeral 60, and a conical-shaped point, such as the point 62, is threaded in the lower flange 52 and positioned in a vertical plane in which the straight side 54 of the upper flange is also positioned. By this means the point 62 is set on a dimension by positioning the said straight side 54 on the dimension.

The threaded stud 28 of the slider, which is fixedly mounted in the lower flange 52, extends through an opening 64 in the upper flange 50, and the thumb or wing nut 26, threaded on the stud, is adapted to clamp the slider on the scale.

In use for describing circles or parts thereof the straight side 54 is set on the graduation of the scale corresponding with the radius of the circle and with the point 38 positioned on the center the arc or circle may be described by the point 62, and when using the tool for describing lines parallel to the edge of a sheet of material the side 66 of the slider is set to the correct dimension on the scale, and with the side 66 against the edge of the sheet of material the point 38 is used to describe a line parallel to the edge of the material by drawing the tool along the material.

The tool is also adapted to be used for various other purposes, and the head and slider may remain on the straight edge or scale, or they may be removed and placed in a case or cabinet when not in use.

From the foregoing description it is thought to be obvious that a scriber and steel rule assembly constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

What is claimed is:

In a scribing tool, the combination which comprises a head including a block, rectangular-shaped in cross section, having a slot parallel to upper and lower surfaces thereof extending throughout the length of the block and extended inwardly from one side to a point spaced from the opposite side providing a lower flange and an upper flange with a vertical wall extended from the lower flange to the upper flange and forming the base of the slot, said upper flange having openings spaced from the ends extended therethrough and also spaced from the side of the block from which the slot extends, studs mounted in the lower flange and having ends extended through the openings of the upper flange the ends of said studs extended through the upper flange being threaded, wing nuts threaded on the threaded ends of the studs for urging the upper flange toward the lower flange, a flat steel rule extended from the slot in the head and positioned with one end seated against the vertical wall therein, a centering stud threaded into the lower flange of the head and positioned in a vertical plane corresponding with that of the vertical wall, said rule being movable longitudinally of the head to adjust the graduated edge thereof in relation to said centering stud, a slider also rectangular-shaped in cross section and having a slot extended inwardly from one end, said slot in the slider being extended to a point spaced from the opposite end of the slider and also providing upper and lower flanges which are positioned to straddle the steel rule, the upper flange of the slider having a vertically disposed opening therein and said opening being spaced from the end from which the slot extends, a stud mounted in the lower flange of the slider and positioned to extend through the opening in the upper flange the end of the stud extended through the upper flange being threaded, a thumb nut threaded on the stud of the slider, said slider having an inner edge parallel to and adapted to be positioned against an opposed inner edge of the head and an outer edge also parallel to the inner edge of the head and providing a gage, and a scribing stud threaded in the lower flange of the slider and positioned with the center thereof in a vertical plane corresponding with the outer edge or gage of the upper flange of the slider.

References Cited in the file of this patent

UNITED STATES PATENTS

| Number | Name | Date |
|---|---|---|
| 663,168 | Hembree | Dec. 4, 1900 |
| 1,043,902 | Burdick | Nov. 12, 1912 |
| 1,195,887 | Wheeler | Aug. 22, 1916 |
| 1,266,845 | Morin | May 21, 1918 |
| 2,332,568 | Gauthier | Oct. 26, 1943 |